United States Patent [19]
Jakubowski, Jr. et al.

[11] Patent Number: 6,073,886
[45] Date of Patent: Jun. 13, 2000

[54] CONSTANT PRESSURE AREA TELESCOPING PISTON AND METHOD OF USING SAME

[75] Inventors: Thaddeus Jakubowski, Jr., St. Charles; John K. Foster, Florissant, both of Mo.

[73] Assignee: McDonnell Douglas Corporation, St. Louis, Mo.

[21] Appl. No.: 09/137,015

[22] Filed: Aug. 20, 1998

[51] Int. Cl.[7] .............. B64D 1/12; B64D 1/04; F15B 11/00; F01B 7/00
[52] U.S. Cl. .......... 244/137.4; 89/1.54; 91/520; 91/535; 92/151; 92/152
[58] Field of Search .......... 244/137.4; 89/1.54, 89/1.57; 60/634; 294/88; 91/520, 535; 92/150, 151, 152; 102/489, 393, 357

[56] References Cited

U.S. PATENT DOCUMENTS

| | | | |
|---|---|---|---|
| 1,482,256 | 1/1924 | Prall ........................................... | 60/480 |
| 2,649,842 | 8/1953 | Caldwell et al. ........................... | 92/52 |
| 2,749,063 | 6/1956 | Low ..................................... | 244/137.4 |
| 3,104,521 | 9/1963 | Sawyer et al. ............................. | 60/634 |
| 3,756,545 | 9/1973 | Coutin .................................. | 244/137.4 |
| 3,871,604 | 3/1975 | Coutin .................................. | 244/137.4 |
| 4,050,656 | 9/1977 | Peterson ................................ | 244/137.4 |
| 4,088,287 | 5/1978 | Hasquenoph et al. ................. | 244/137.4 |
| 4,202,514 | 5/1980 | Chen ..................................... | 254/93 H |
| 4,242,947 | 1/1981 | Renner et al. ............................ | 92/108 |
| 4,388,853 | 6/1983 | Griffin et al. ............................ | 89/1.57 |
| 4,399,968 | 8/1983 | Stock et al. ........................... | 244/137.4 |
| 4,409,884 | 10/1983 | Boehringer ............................... | 91/171 |
| 4,441,674 | 4/1984 | Holtrop ................................ | 244/137.4 |
| 4,466,334 | 8/1984 | Holtrop ................................ | 244/137.4 |
| 4,608,912 | 9/1986 | Navarette ................................. | 92/5 R |
| 4,791,854 | 12/1988 | Banicevic .................................. | 92/151 |
| 4,850,553 | 7/1989 | Takata et al. ......................... | 244/137.4 |
| 4,964,595 | 10/1990 | Nordhaus ............................. | 244/137.4 |
| 5,029,776 | 9/1991 | Jakubowski et al. ................. | 244/137.4 |
| 5,583,312 | 12/1996 | Jakubowski, Jr. ....................... | 89/1.54 |

FOREIGN PATENT DOCUMENTS

| | | | |
|---|---|---|---|
| 180519 | 5/1986 | European Pat. Off. ............ | 244/137.4 |
| 2408521 | 7/1979 | France ................................ | 244/137.4 |
| 2701895 | 9/1977 | Germany ............................. | 244/137.4 |
| 1058997 | 2/1967 | United Kingdom ................ | 244/137.4 |
| 1323073 | 7/1973 | United Kingdom ................ | 244/137.4 |
| WO 81/03314 | 11/1981 | WIPO ................................. | 244/137.4 |

*Primary Examiner*—Michael J. Carone
*Assistant Examiner*—Fredrick T. French, III
*Attorney, Agent, or Firm*—Stout, Uxa, Bluyan & Mullins, LLP; Donald E. Stout

[57] ABSTRACT

An actuator assembly that has a constant net pressure area telescoping piston. The actuator assembly has a cylindrical housing; nesting, telescoping pistons; a central plug; an outer cap; and a vent. The cylindrical housing has an interior surface and a base that terminates at an open end. The nesting, telescoping pistons are located in the housing and can extend past the housing open end. The telescoping pistons have an outer piston slidably sealed against the housing and an inner piston that is slidably sealed against the outer piston. The outer piston has a first end proximal to the housing base, and a second end distal to the housing base. The inner piston has an open end proximal to the housing base, and a closed end distal to the housing base. The central plug extends from the base and into the telescoping pistons. The central plug is in pressurized communication with the inner piston and is engagable with a pressurized fluid source. The outer cap has a first and a second member. The first member is sealed against the outer piston first end. The second member radially extends inwardly from the first member and is slidably sealed against the fixed central plug. The vent extends through the housing to a portion of the housing interior surface between the base and the outer piston cap. With this arrangement, the net pressure area on the telescoping piston remains the area of the inside of the inner piston closed end throughout the piston stroke.

17 Claims, 5 Drawing Sheets

CONSTANT PRESSURE AREA TELESCOPING PISTON AND METHOD OF USING SAME

BACKGROUND OF THE INVENTION

1. Field of the Invention

This invention relates to the field of fluid powered actuators, and in particular to an actuator for ejecting stores (e.g. bombs or missiles) from an aircraft.

2. Description of the Prior Art

Ejector systems for ejecting stores from aircraft have a long history of use. The ejector system sends a pressurized fluid, either gas or liquid, to an actuator. The actuator extends and pushes a store from the aircraft. The actuator needs to push with such force that the store rapidly moves through the airflow streaming over the aircraft. Less than rapid ejection of the store results in the store's trajectory being changed by the airflow. Any changes in the store's trajectory result in inaccurate landing of the store or the store colliding with another store or with the aircraft.

The pressurized fluid that ejector systems use to extend the actuator include cold gases, hot gases, or hydraulics. An example of a cold gas ejector system is disclosed in U.S. Pat. No. 5,583,312 to Jakubowski entitled "Cold Gas Ejector Rack" ("Jakubowski '312"). An example of a hot gas ejector system is disclosed in U.S. Pat. No. 5,029,776 to Jakubowski et al entitled "Variable Explosive Source for an Ejector System"("Jakubowski '776"). All of these U.S. Patents are expressly incorporated herein by reference in their entireties.

The actuators used in ejection systems typically comprise piston assemblies. Examples of piston assemblies are disclosed in previously referenced Jakubowski '312 and Jakubowski '776, along with U.S. Pat. Nos. 4,388,853 to Griffin et al. entitled "Missile Launchers" ("Griffin") and 4,088,287 to Hasquenoph et al. entitled "Dual-Purpose Ejector For Aircraft Load Jettisoning Mechanism" ("Hasquenoph"), both of which are expressly incorporated herein by reference in their entireties.

Telescoping piston assemblies are used in actuators to save space. Telescoping pistons take up less volume when nested in the pre-stroke position. Having piston assemblies take up less volume is desirable due to the space limitations aboard aircraft. Previously referenced Jakubowski '776, Griffin, and Hasquenoph disclose telescoping piston assemblies.

Figure 1:
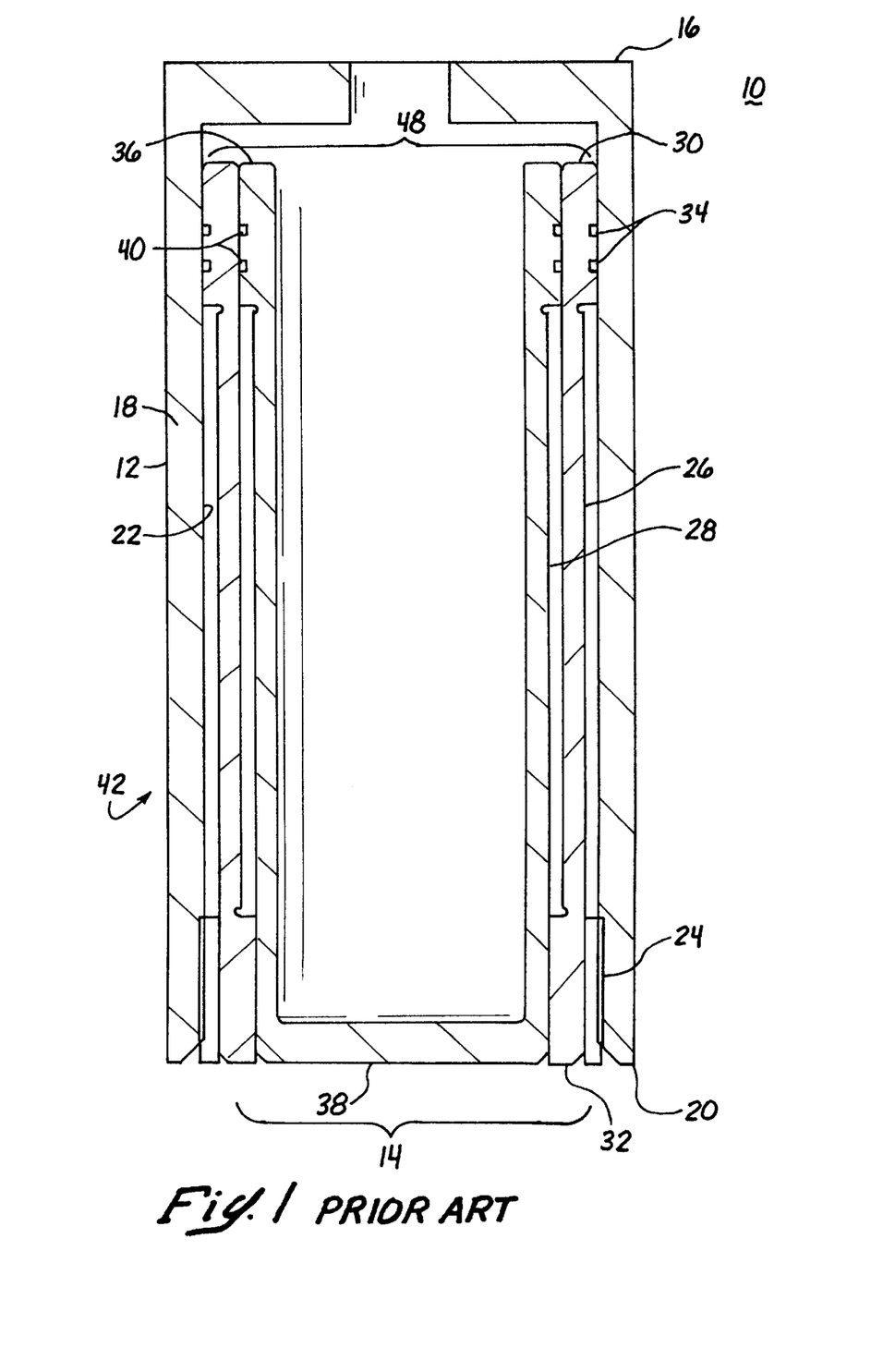
FIG. 1 is a cross sectional view of a conventional actuator assembly with telescoping pistons in a pre-stroke position.
Figures 2, 3:
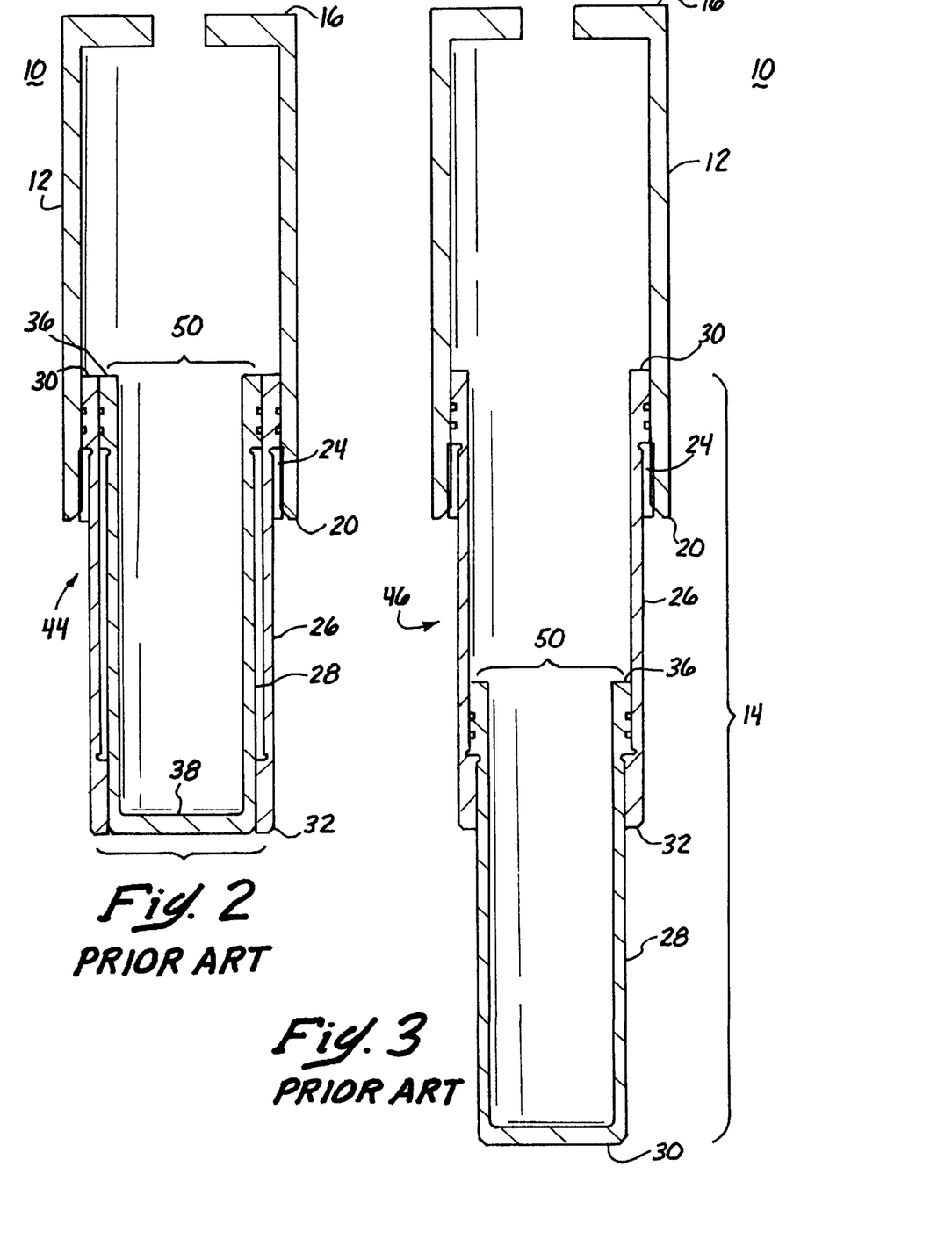
FIG. 2 is a cross sectional view of a conventional actuator assembly with telescoping pistons at a staging position.
FIG. 3 is a cross sectional view of a conventional actuator assembly with telescoping pistons at the end of a stroke.

Referring now to PRIOR ART FIGS. 1–3, wherein like reference numbers refer to like elements in the figures, a conventional actuator 10 has a cylindrical housing 12 and nesting, telescoping pistons 14. The housing 12 has a base 16 and a wall 18. The wall extends from the base 16 and terminates in an open end 20. The wall 18 has an interior surface 22. A stopping flange 24 radially extends into the housing 12 from the open end 20.

The telescoping pistons 14 have an outer piston 26 and an inner piston 28. The outer piston 26 has a flanged first end 30 that is proximate to the base 16, and a flanged second end 32 that is distal to the base. The first end 30 is slidably sealed against the housing interior surface 22 via seals 34 disposed therebetween. This arrangement permits the outer piston 26 to extend from the housing 12 until the first end 30 contacts the stopping flange 24, while inhibiting fluid transfer past the seals 34.

The inner piston 28 has a flanged open end 36 proximate to the base 16, and a closed end 38 distal to the base. The inner piston 28 is slidably sealed against the outer piston 26 via seals 40 disposed between the outer piston 26 and the inner piston open end 36. This arrangement permits the inner piston 28 to extend from the outer piston 26 until the inner piston open end 36 contacts the outer piston second end 32. Other conventional telescoping pistons may have more than two pistons.

The telescoping pistons 14 extend from the actuator 10 in a stroke to push the stores from the aircraft. The telescoping pistons 14, as shown in PRIOR ART FIG. 1, are nested in the housing 12 in the pre-stroke position 42. PRIOR ART FIG. 2 shows the pistons 14 stroked out to the point of staging position 44. At staging position 44, the outer piston 26 is fully extended from the housing 12 with the outer piston first end 30 in contact with the stopping flange 24. The inner piston 28 is still nested in the outer piston 26. PRIOR ART FIG. 3 show the pistons 14 at the end of the stroke position 46. The inner piston 28 is fully extended from the outer piston 26, with the inner piston open end 36 being in contact with the outer piston second end 32. As a result of the nesting arrangement, the stroke length of the pistons 14 are essentially twice the length of a single piston.

Figure 4:
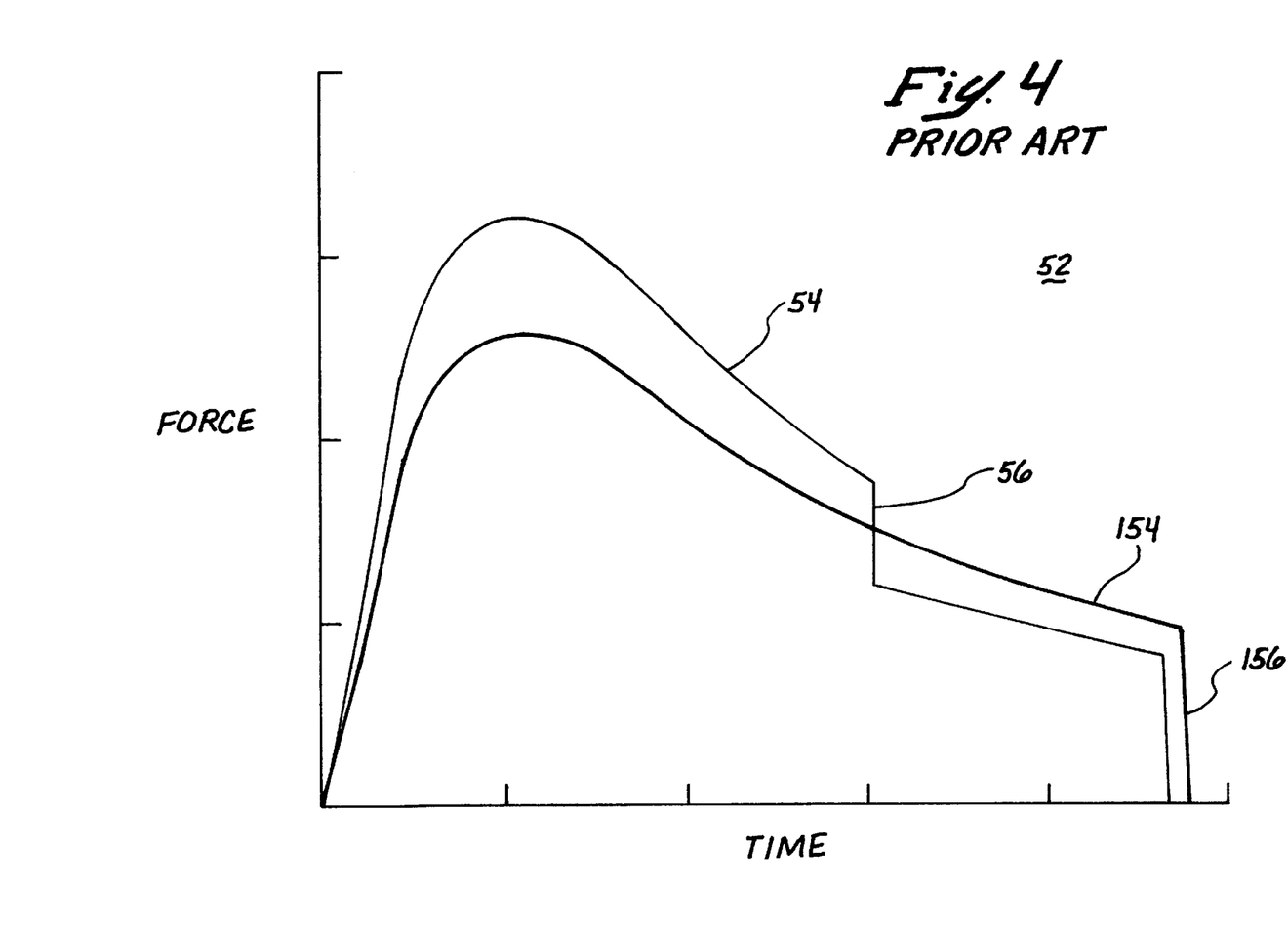
FIG. 4 is a force-time graph of the pressure exerted during a stroke of conventional telescoping pistons and a stroke of telescoping pistons according to the claimed invention.

The conventional telescoping pistons 14 have a stepped decrease in force during the stroke. This is a result of the acting pressure area decreasing in a step-wise fashion during the stroke. Between the pre-stroke position 42 and the staging position 44, the acting pressure area is a first area 48 defined by the circumference of the outer piston first end 30. After the stage 44, the acting pressure area steps down to a smaller, second area 50 defined by circumference of the inner piston open end 36. Referring now to FIG. 4, a graph 52 shows the force vs time plot 54 of a typical telescoping piston arrangement. The instantaneous drop in force at point 56 corresponds to when the pistons 14 reach the staging position 44 and the acting pressure area drops from the larger, first area 48 to the smaller, second area 50.

A stepped decrease in force during the stroke is not desirable under some circumstances. The stepped decrease in force during a stroke results in a relatively high peak ejection force. The relatively high peak ejection force results in requiring a supporting frame, such as an airplane wing, that is reinforced enough to accommodate the relatively high peak ejection force. The reinforced supporting frame adds excess structure and weight to the aircraft, with accompanying undesirable results as is known to those skilled in the art.

What is needed, therefore, are telescoping pistons that have a relatively constant net pressure area during the entire stroke to provide the requisite work while having a relatively low peak ejection force.

SUMMARY OF THE INVENTION

It is an object of the invention to provide a compact actuator system with telescoping pistons that have a relatively constant net pressure area during the entire stroke.

It is another object of the invention to provide telescoping pistons that provide a relatively smooth force throughout the stroke.

It is still another object of the invention to provide an ejector system having telescoping pistons that have a relatively constant net pressure area during the entire stroke.

In order to achieve these and other objects, the invention provides an actuator assembly that has a constant net pressure area telescoping piston. The actuator assembly has a cylindrical housing; nesting, telescoping pistons; a central plug; an outer cap; and a vent. The cylindrical housing has an interior surface and a base that terminates at an open end. The nesting, telescoping pistons are located in the housing and can extend past the housing open end. The telescoping pistons have an outer piston slidably sealed against the housing and an inner piston that is slidably sealed against the outer piston. The outer piston has a first end proximal to the housing base, and a second end distal to the housing base. The inner piston has an open end proximal to the housing base, and a closed end distal to the housing base. The central plug extends from the base and into the telescoping pistons. The central plug is in pressurized communication with the inner piston and is engagable with a pressurized fluid source. The outer cap has a first and a second member. The first member is sealed against the outer piston first end. The second member radially extends inwardly from the first member and is slidably sealed against the fixed central plug. The vent extends through the housing to a portion of the housing interior surface between the base and the outer piston cap. With this arrangement, the net pressure area on the telescoping piston remains the area of the inside of the inner piston closed end throughout the piston stroke.

Another aspect of the invention provides an actuator assembly having a cylindrical housing; nesting, telescoping pistons; a central plug; and an isolation means. The cylindrical housing has an interior surface and a base that terminates at an open end. The nesting, telescoping pistons are located in the housing and can extend past the housing open end. The telescoping pistons have an outer piston slidably sealed against the housing and an inner piston that is slidably sealed against the outer piston. The outer piston has a first end proximal to the housing base, and a second end distal to the housing base. The inner piston has an open end proximal to the housing base, and a closed end distal to the housing base. The central plug extends from the base and into the telescoping pistons. The central plug is in pressurized communication with the inner piston and is engagable with a pressurized fluid source. The isolation means maintains ambient pressure in a first portion of the housing interior space. The first portion of the housing interior space is generally annular in shape and is defined by the housing base, the housing interior surface, a sealing means, and the central plug. The remainder of the housing interior space is the second portion. The sealing means inhibits fluid transfer between the housing interior space first portion and the housing interior space second portion In a further aspect of the invention, the isolation means has a venting means for enabling a fluid to pass through the housing to the housing interior space first portion.

In a still further aspect of the invention, the sealing means has an outer piston means and a plug sealing means. The outer piston means seals the sealing means to the outer piston. The plug sealing means slidably seals the sealing means to the central plug.

In an additional aspect of the invention, a process for ejecting stores from an aircraft has the steps of providing an actuator assembly as described in one of the previously illustrated aspects of the invention, positioning the stores to enable the actuator to stroke and eject the stores from the aircraft, and ejecting the stores by directing a fluid into the actuator assembly, resulting in the actuator stroking and pushing the stores.

Other and further objects and advantages will appear hereinafter.

DETAILED DESCRIPTION OF THE PREFERRED EMBODIMENTS

Now referring to FIGS. 5–8, wherein reference numbers, and the elements to which they refer, correlate to reference numbers in FIGS. 1–4 (prior art) increased by one hundred, an actuator 110 has a cylindrical housing 112; nesting, telescoping pistons 114; a central plug 160; an outer piston cap 162; and a vent 164. The housing 112 and the telescoping pistons 114 are similar to the housing 12 and telescoping pistons 14 of the conventional actuator system 10 components. The central plug 160, the outer piston cap 162, and the vent 164 enable the actuator 110 to have a constant net pressure area 192 during the entire stroke.

Discussing the conventional aspects of the invention, the housing 112 has a base 116 at one end, a wall 118 extending from the base 112 and terminating in an open end 120. The housing 112 defines an interior space 190. The wall 118 has an interior surface 122. A stopping flange 124 radially extends from the interior surface 122 at the open end 120.

The nesting, telescoping pistons 114 have an outer piston 126 and an inner piston 128. The outer piston 126 has a flanged first end 130 that is proximate to the base 116, and a flanged second end 132 that is distal to the base. The first end 130 is slidably sealed against the housing interior surface 122 via seals 134 disposed therebetween. This arrangement permits the outer piston 126 to extend from the housing 112 until the first end 130 contacts the stopping flange 124, while inhibiting fluid transfer past the seals 134.

The inner piston 128 of the telescoping pistons 114 has a flanged open end 136 proximate to the base 116, and a closed end 138 distal to the base. The inner piston 128 is slidably sealed against the outer piston 126 via seals 140 disposed between the outer piston 126 and the inner piston open end 136. This arrangement permits the inner piston 128 to extend from the outer piston 126 until the inner piston open end 136 contacts the outer piston second end 132. Other embodiments of the invention may have one or more pistons slidably sealed between the outer piston 126 and the inner piston 128 (not shown).

Figure 5:
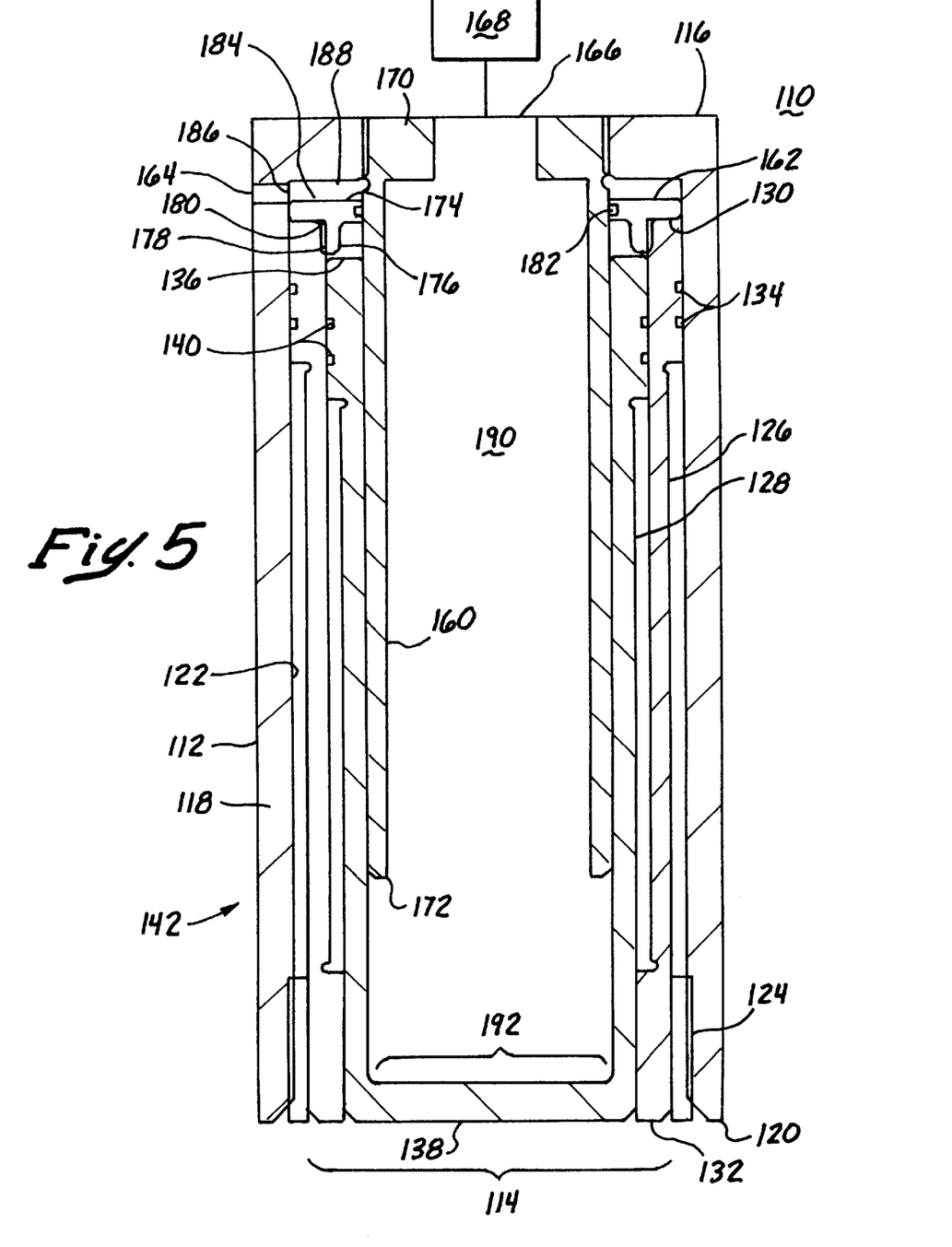
FIG. 5 is a cross sectional view of an actuator assembly with telescoping pistons according to the claimed invention in a pre-stroke position.

In addition to the conventional elements of the invention, the actuator system 110 has the central plug 160, the outer piston cap 162, and the vent 164. The central plug 160 has a first end 170 located at the base 116 and a second end 172 that extends into the inner piston 128, as shown in FIG. 5. The first end 170 is engaged with a pressurized fluid source 168 via port 166. In a preferred embodiment of the invention, the pressurized fluid source 168 is a cold gas ejector rack mounted in an aircraft delivering a cold gas, as disclosed in Jakubowski '312. Other embodiments of the invention may have the pressurized fluid source 168 delivering hot gas or hydraulics. Other embodiments of the invention may have the pressurized fluid source delivering any other suitable fluid from any other suitable device. The present invention is useful for any application that requires telescoping pistons, including any suspension equipment or release equipment. The second end 172 of the central plug 160 is in pressurized communication with the inner piston 128.

The outer piston cap 162 is comprised of a first member 174 and a second member 176. The second member 176 is an axially oriented ring that has a first end 178 that is sealed against the outer piston first end 130, and a second end 180 that extends toward the base 116. The first member 174 is of an annular disk shape and extends radially inwardly from the second member second end 180 toward the central plug 160. A seal 182 is disposed between the first member 174 and the central plug 160 such that the first member 174 is slidably sealed against the central plug 160 for the entire length of a stroke of the outer piston 126. In the shown embodiment, the outer piston cap 162 also has annular portion 184 that radially extends outwardly from the first member 174 and is on the first end 130 of the outer piston 126. Other embodiments may have other suitable configurations for the outer piston cap 162 that operate as a sealing means for inhibiting fluid transfer between the outer piston cap 126 and the central plug 160.

The vent 164 is a bore that extends through the housing wall 118 near the base 116 to an opening 186 in the housing interior surface 122. The purpose of the vent 164 is to enable ambient air, or any fluid outside of the housing 112, to pass through the housing 112 and into a portion 188 of the housing interior space 190. The portion 188 is defined by the base 116, the housing interior surface 122, the outer piston cap 162, and the central plug 160 and is generally annular in shape. Other embodiments of the invention may have other means for enabling a fluid to pass through the housing to the portion 188.

The vent 164 and the outer piston cap 162 operate together as a means for maintaining ambient pressure in the portion 188 of the housing interior space 190 during the entire stroke of the pistons 114 by inhibiting fluid transfer between the portion 188 and the remainder of the housing interior space 190. By maintaining the ambient pressure in the portion 188, inner piston 128 fully extends before the outer piston 126, as described in detail below. As a result, the actuator 110 has a constant net pressure area 192 throughout the entire stroke. The net pressure area 192 is the area of circular area of the inside surface of the closed end 138 of the inner piston 128.

As shown in FIG. 5, at the beginning of the stroke, the telescoping pistons 114 are nested in the housing 112 in the pre-stroke position 142. To start the stroke, a fluid is directed from source 168 to the central plug 160 via port 166. In a preferred embodiment, the fluid is cold gas. In other embodiments of the invention, the fluid is hot gas, hydraulic fluid, or any other suitable pressurized gas or liquid.

Figure 6:
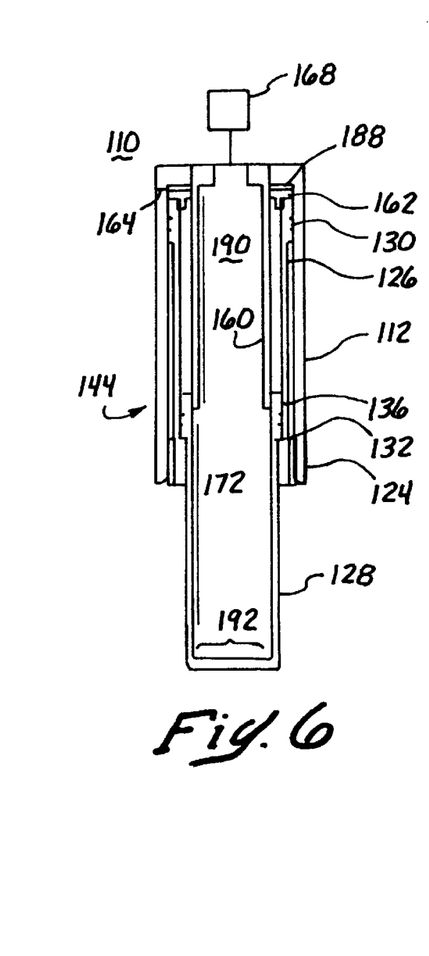
FIG. 6 is a cross sectional view of an actuator assembly with telescoping pistons according to the claimed invention at a first stage completion position.

The pistons 114 are shown at a first stage completion position 144 in FIG. 6. At the position 144, the inner piston open end 136 is in contact with the outer piston second end 132, resulting in the inner piston 128 being fully extended from the outer piston 126. The open end 136 of the inner piston 128 is proximate to the second end 172 of the central plug 160. The outer piston 128 has not moved and is still nested in the housing 112. Also note that as the outer piston cap 162 has not moved, the volume of portion 188 of the housing interior space 190 has not changed.

Figure 7:
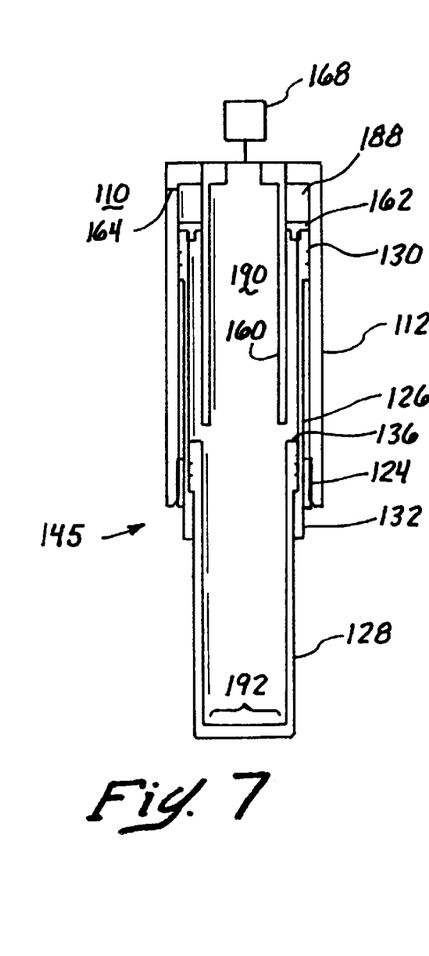
FIG. 7 is a cross sectional view of an actuator assembly with telescoping pistons according to the claimed invention after uncorking the central plug.

After the first stage completion position 144, the outer piston 126 begins to stroke in conjunction with the inner piston 128. FIG. 7 shows the uncorked position 145 where the central plug 160 has "uncorked" from the inner piston 128. The outer piston 126 is now pressurized. As the outer piston cap 162 moved along with the outer piston 126, the volume of portion 188 has increased. The pressure in the portion 188 of the housing interior space 190 is still ambient because vent 164 enables ambient air to flow into the portion 188. As a result, the force exerted by the pistons 114 is still relatively constant in that the net pressure area on the pistons 114 is still the constant net pressure area 192.

Figure 8:
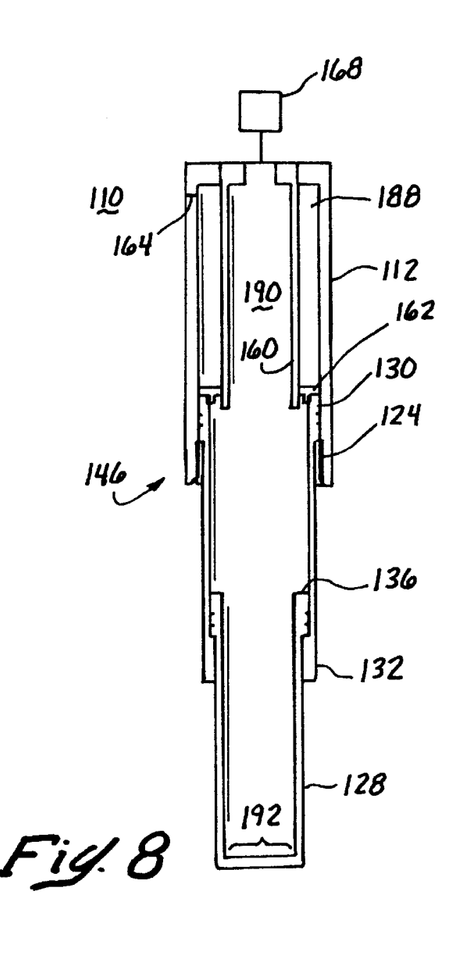
FIG. 8 is a cross sectional view of an actuator assembly with telescoping pistons according to the claimed invention at the end of a stroke.

At the stroke completion position 146, as shown in FIG. 8, the outer piston 126 is fully extended with the flanged first end 130 in contact with the stopping flange 124. As a result of the nesting arrangement, the stroke length of the pistons 114 is essentially twice the length of a single piston. Also, the outer piston cap 162 has moved further along with the outer piston 126, resulting in the volume of portion 188 increasing. The pressure in the portion 188 of the housing interior space 190 is still ambient because vent 164 enables ambient air to flow into the portion 188. As a result, the force exerted by the pistons 114 is still relatively constant in that the net pressure area on the pistons 114 is still the constant net pressure area 192.

Referring now to FIG. 4, the graph 52 shows one example of the force vs. time plot 154 of the telescoping piston arrangement 114 of the current invention. Relative to the force vs. time plot 54 of the prior art telescoping pistons 14, the plot 154 of the invention is relatively smooth. The plot 154 does drop off at point 156, which corresponds with the stroke completion position 146. By eliminating the change in net pressure area on the pistons 114, the invention provides a smooth force on ejecting stores.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

We claim:

1. An actuator assembly comprising:
   a. a cylindrical housing comprising an interior surface and a base that terminates at an open end;
   b. a nesting, telescoping piston assembly being disposed in said housing and being extendable past said housing open end, said telescoping piston assembly comprising:
      i. an outer piston slidably sealed against said housing, said outer piston having a first end proximal to said housing base, and a second end distal to said housing base; and
      ii. an inner piston slidably sealed against said outer piston, said inner piston comprising an open end proximal to said housing base, and a closed end distal to said housing base;
   c. a central plug extending from said base and into said telescoping piston assembly, said central plug being in pressurized communication with said inner piston and being engageable with a pressurized fluid source;
   d. an outer cap comprising:

i. a first member sealed against said outer piston first end; and
  ii. a second member radially extending inwardly from said first member and being slidably sealed against said central plug; and
  e. a vent extending through said housing to a portion of said housing interior surface between said base and said outer piston.

2. The assembly of claim 1, wherein:
  a. said housing comprises a stop radially extending into said housing from said housing open end;
  b. said outer piston first end is sealed against said housing interior surface and slidable between said housing base and stop;
  c. said inner piston open end is slidable between said outer piston first end and said outer piston second end; and
  d. said central plug is at least partially disposed in said inner piston when said inner piston open end is adjacent to said housing base.

3. The assembly of claim 2, wherein said stop is a stopping flange.

4. The assembly of claim 1, wherein:
  a. said outer cap first member comprises a ring portion extending axially from said second member and distally from said housing base, said ring portion being sealed to said outer piston first end; and
  b. said outer cap comprises an annular portion extending radially outwardly from said second member toward said housing interior surface.

5. The assembly of claim 1, wherein:
  a. said central plug comprises an open end located distally from said housing base; and
  b. said inner piston is slidable beyond said central plug open end.

6. The assembly of claim 1, wherein said assembly is installed in a cold gas ejector rack, a hot gas ejector rack, or a pneumatic ejector rack.

7. The assembly of claim 1, wherein:
  a. said central plug comprises an open end located distally from said housing base and said central plug open end is disposed in said inner piston when said inner piston open end is adjacent to said housing base;
  b. said outer cap first member comprises a ring portion extending axially from said second member and distally from said housing base, said ring portion being sealed to said outer piston first end;
  c. said outer cap comprises an annular portion extending radially outwardly from said second member toward said housing interior surface;
  d. said housing comprises a stopping flange radially extending into said housing from said housing open end;
  e. said outer piston first end is sealed against said housing interior surface and slidable between said housing base and stop; and
  f. said inner piston open end being slidable between said outer piston first end and said outer piston second end, an being slidable beyond said central plug open end.

8. The assembly of claim 7, wherein said assembly is installed in a cold gas ejector rack, a hot gas ejector rack, or a pneumatic ejector rack.

9. An actuator assembly comprising:
  a. a cylindrical housing comprising an interior surface and a base that terminates at an open end;
  b. nesting, telescoping pistons being disposed in said housing and extendable past said housing open end, said pistons comprising:
    i. an outer piston slidably sealed against said housing, said outer piston having a first end proximate to said housing base, and a second end distal to said housing base; and
    ii. an inner piston sidably sealed against said outer piston, said inner piston comprising an open end proximate to said housing base, and a closed end distal to said housing base;
  c. a central plug extending from said base and into said telescoping pistons, said central plug being in pressurized communication with said inner piston, said central plug being engageable with a pressurized fluid source; and
  d. isolation means for maintaining ambient pressure in a first portion of said housing interior space, comprising sealing means for inhibiting fluid transfer between a housing interior space first portion and a housing interior space second portion, wherein said housing interior space comprises:
    i. said first portion being defined by said housing base, said housing interior surface, said sealing means, and said central plug, said first portion being generally annular in shape; and
    ii. a second portion being defined as the remainder of the housing interior space.

10. The assembly of claim 9, wherein said isolation means comprises venting means for enabling a fluid to pass through said housing to said housing interior space first portion.

11. The assembly of claim 10, wherein said sealing means comprises:
  a. outer piston means for sealing said sealing means to said outer piston first end; and
  b. plug sealing means for slidably sealing said sealing means to said central plug.

12. The assembly of claim 11, wherein said assembly is installed in a cold gas ejector rack, a hot gas ejector rack, or a pneumatic ejector rack.

13. A process for ejecting stores from an aircraft comprising the steps of:
  a. providing an ejector system in the aircraft, said ejector system comprising at least one actuator assembly comprising:
    i. a cylindrical housing comprising an interior surface and a base that terminates at an open end;
    ii. nesting, telescoping pistons being disposed in said housing and extendable past said housing open end, said pistons comprising an outer piston slidably sealed against said housing, said outer piston having a first end proximate to said housing base, and a second end distal to said housing base, and an inner piston slidably sealed against said outer piston, said inner piston comprising an open end proximate to said housing base, and a closed end distal to said housing base;
    iii. a central plug extending from said base and into said telescoping pistons, said central plug being in pressurized communication with said inner piston, said central plug being engageable with a pressurized fluid source;
    iv. an outer cap comprising a first member sealed against said outer piston first end, and a second member radially extending inwardly from said first member and being slidably sealed against said central plug; and v. at least a vent extending through said housing to a portion of said housing interior surface between said base and said outer piston;

b. positioning said stores to enable said actuator assembly to stroke and eject said stores from said aircraft; and c. ejecting said stores by directing a fluid into said actuator assembly such that said actuator assembly completes a stroke.

14. The process of claim 13, wherein said ejector system is a cold gas ejector rack, a hot gas ejector rack, or a pneumatic ejector rack.

15. The process of claim 13, wherein:

a. said housing comprises a stop radially extending into said housing from said housing open end;

b. said outer piston first end is sealed against said housing interior surface and slidable between said housing base and stop;

c. said inner piston open end being slidable between said outer piston first end and said outer piston second end; and d. said central plug is at least partially disposed in said inner piston when said inner piston open end is adjacent to said housing base.

16. The process of claim 13, wherein:

a. said outer cap first member comprises a ring portion extending axially from said second member and distally from said housing base, said ring portion being sealed to said outer piston first end; and b. said outer cap comprises an annular portion extending radially outwardly from said second member toward said housing interior surface.

17. The process of claim 13, wherein:

a. said central plug comprises an open end located distally from said housing base; and b. said inner piston being slidable beyond said central plug open end.

* * * * *